United States Patent
Albou et al.

(10) Patent No.: US 6,874,923 B2
(45) Date of Patent: Apr. 5, 2005

(54) LIGHTING DEVICE OF THE ELLIPTICAL TYPE FOR AN AUTOMOBILE

(75) Inventors: Pierre Albou, Bobigny Cedex (FR); Eric Blusseau, Bobigny Cedex (FR); Laurent Jeannot, Bobigny Cedex (FR)

(73) Assignee: Valeo Vision (FR)

(*) Notice: Subject to any disclaimer, the term of this patent is extended or adjusted under 35 U.S.C. 154(b) by 0 days.

(21) Appl. No.: 10/283,435

(22) Filed: Oct. 30, 2002

(65) Prior Publication Data

US 2003/0081424 A1 May 1, 2003

(30) Foreign Application Priority Data

Oct. 30, 2001 (FR) .......................................... 01 14184

(51) Int. Cl.[7] .............................................. B60Q 1/04
(52) U.S. Cl. ..................... 362/512; 362/351; 362/539
(58) Field of Search ................................. 362/539, 509, 362/512, 282, 322, 513, 351

(56) References Cited

U.S. PATENT DOCUMENTS

| | | | |
|---|---|---|---|
| 4,100,594 A | 7/1978 | Gould | 362/308 |
| 5,285,358 A | 2/1994 | Watanabe et al. | 362/61 |
| 5,673,990 A * | 10/1997 | Neumann et al. | 362/282 |
| 6,280,067 B1 * | 8/2001 | Albou | 362/459 |
| 6,425,683 B1 * | 7/2002 | Kusagaya et al. | 362/512 |
| 6,443,606 B1 * | 9/2002 | Mochizuki | 362/513 |
| 6,457,849 B2 * | 10/2002 | Tsukamoto | 362/509 |
| 6,467,940 B2 * | 10/2002 | Eschler et al. | 362/510 |
| 6,474,854 B2 * | 11/2002 | Ohshio | 362/512 |
| 6,550,944 B2 * | 4/2003 | Kusagaya | 362/466 |

FOREIGN PATENT DOCUMENTS

| | | |
|---|---|---|
| FR | 2 363 053 | 3/1978 |
| FR | 2 669 399 | 5/1992 |
| FR | 2 788 836 | 7/2000 |

OTHER PUBLICATIONS

French Search Report, Jul. 11, 2002.

* cited by examiner

*Primary Examiner*—Thomas M. Sember
(74) *Attorney, Agent, or Firm*—Morgan & Finnegan, LLP

(57) ABSTRACT

The present invention concerns a lighting device for an automobile, comprising a light source situated at the first focus of a reflector of the elliptical type, a convergent lens being disposed in front of the light source so that the second focus of the elliptical reflector is contained in the object focal plane of the convergent lens, the first and second foci of the elliptical reflector defining an optical axis of the lighting device.

According to the present invention, an obscuring element is disposed substantially perpendicular to the optical axis and at a distance from the object focal plane of the convergent lens.

11 Claims, 3 Drawing Sheets

LIGHTING DEVICE OF THE ELLIPTICAL TYPE FOR AN AUTOMOBILE

FIELD OF THE INVENTION

The present invention concerns lighting devices intended to equip automobiles, and particularly those which are of the elliptical reflector type.

BACKGROUND OF THE INVENTION

It is known that such lighting devices include a light source situated at the first focus of a reflector of the elliptical type, a convergent lens being disposed in front of the light source so that the object focus of this lens coincides with the second focus of the elliptical reflector, the first and second foci of the elliptical reflector defining an optical axis of the lighting or indicating device.

In this way, the elliptical reflector mirror forms on the light source a real image at its second focus, which is then projected by the convergent lens, usually plano-convex, onto the road in front of the vehicle. The elliptical reflector can then have a design designed so that the lighting beam thus formed corresponds to the regulations for a regulatory "main beam".

With such a lighting or signaling device, when it is wished to produce a regulatory "dipped" lighting beam, it is known how to dispose a screen, extending in a plane perpendicular to the optical axis and situated in the focal plane of the convergent lens, the edge of this screen being disposed in the immediate vicinity of the optical axis so as to obscure some of the light rays reaching the convergent lens and thus to determine an upper cutoff in the beam emerging from the convergent lens and projected onto the road, so as not to dazzle the drivers of vehicles traveling in the opposite direction.

Also as known, the same headlight can be used for producing these two main and dipped beams selectively. It suffices in fact to make the screen movable, between a position in which it forms the cutoff of the final dipped beam by intercepting some of the light rays, and in a position in which it is away from the light beam incident on the convergent lens so as to form a main beam without cutoff.

In the case of such a headlight able to selectively emit main or dipped beams, with different photometries, by virtue of the use of a movable screen, the same reflector is used for producing these two beams. It is then necessary for the elliptical reflector to be capable of constructing a light beam with a long range for a main beam and with large width for a dipped beam. These two characteristics being contradictory, the elliptical reflector is therefore designed according to a compromise in order to be able to produce these two beams to the best possible extent.

The result is therefore that each beam, main or dipped, considered individually, although perfectly in accordance with the regulations, does not have all the characteristics of a beam constructed by a headlight dedicated to a single dipped or main beam function, in terms of visual comfort for the vehicle driver equipped with a single-beam headlight. It is therefore desirable in this case to correct at least one of the beams in order to improve its photometry.

Moreover, it is desirable to implement lighting functions which are added to those which are provided for main or dipped beams. For example, in rainy weather, it may be wished to illuminate less the side of the road on which the vehicles are traveling in the opposite direction, so that their drivers are less dazzled by the reflection of the light on the part of the roadway situated between two vehicles traveling in opposite directions.

The present invention is placed in this context and its aim is to propose a lighting device for an automobile which produces at least one of the dipped beams with a regulatory photometry, and which includes means for modifying the photometry thereof at predetermined places in the light beam.

The object of the present invention is therefore a lighting device for an automobile, having a light source situated at the first focus of a reflector of the elliptical type, a convergent lens being disposed in front of the light source so that the second focus of the elliptical reflector is contained in the object focal plane of the convergent lens, the first and second foci of the elliptical reflector defining an optical axis of the lighting device.

SUMMARY OF THE INVENTION

According to the present invention, an obscuring element is disposed substantially perpendicular to the optical axis, at a distance from the object focal plane of the convergent lens, and outside a vertical plane passing through the optical axis.

According to other characteristics of a first embodiment, which are advantageous and non-limiting of the invention:
  the obscuring element is disposed in the lighting device fixedly with respect to the light source;
  the obscuring element is formed on a piece integral with the reflector;
  the lighting device has a screen intended to define a cutoff in the light beam emitted;
  the screen is able to move between two positions, a first position in which it intercepts some of the light rays reflected by the reflector so that the beam emerging from the lens incorporates a cutoff, and a second position in which it allows all the light rays reflected by the reflector to pass so that the beam emerging from the lens does not incorporate any cutoff.

According to advantageous characteristics of a second embodiment, which are advantageous and non-limiting of the invention:
  the obscuring element is formed on a screen delimiting a cutoff in the light beam emerging from the lens;
  the screen is able to move between two positions, a first position in which it intercepts some of the light rays reflected by the reflector so that the beam emerging from the lens incorporates a cutoff, and a second position in which it allows all the light rays reflected by the reflector to pass so that the beam emerging from the lens does not incorporate any cutoff;
  the obscuring element forms the end of a piece integral with the screen.

According to a third embodiment, the obscuring element is formed on a movable support. The support is for example able to move in rotation about an axis perpendicular to the optical axis.

Other aims, characteristics and advantages of the present invention will emerge clearly from the description which will now be made of an example embodiment given non-limitingly with reference to the accompanying drawings, in which:

DESCRIPTION OF THE PREFERRED EMBODIMENTS

In the various figures, the identical elements or those fulfilling the same role are allocated the same reference signs, possibly allocated a "prime" or a double dash.

Figure 1:
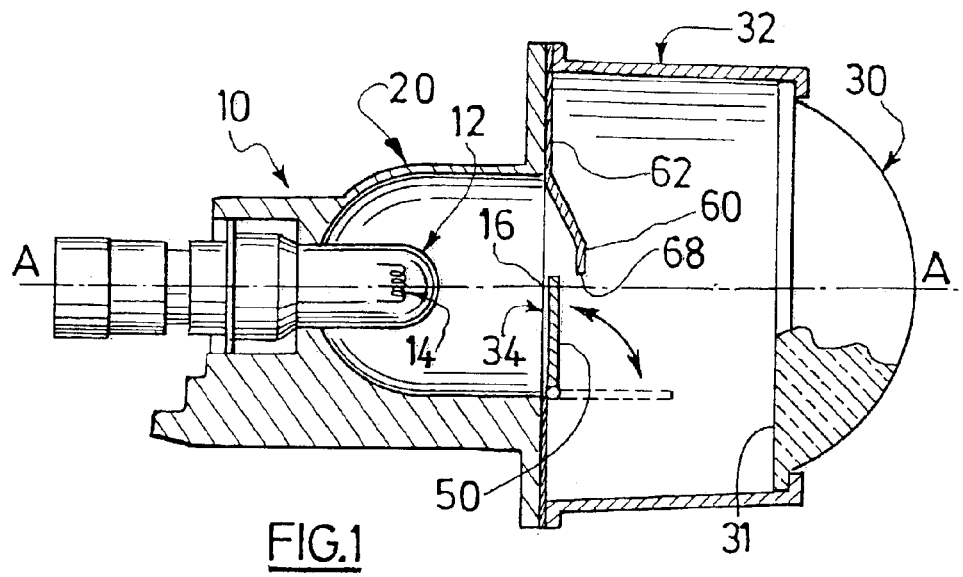
FIG. 1 depicts a schematic view in section of a headlight of the elliptical type according to a first embodiment of the present invention.

FIG. 1 depicts a headlight 10 of the elliptical type, comprising a bulb 12 containing a light source 14. This light source can, as depicted, be the filament of an incandescent or halogen lamp, or the electric arc of a discharge lamp. The light source is placed at the first focus of an elliptical reflector 20. The headlight 10 also has a convergent lens 30, for example plano-convex, placed in front of the reflector 20 and the light source 14, the plane face 31 being situated on the same side as the reflector 20.

In the present description, the terms "front" and "rear" will be used by reference to the direction of propagation of the light beam emitted by the headlight 10. In FIG. 1, the front is thus to the right and the rear to the left.

The lens 30 is disposed in an intermediate part 32 at the front of the light source 14 so that its focal plane 34 contains the second focus 16 of the elliptical reflector 20. In this way, the light rays emitted by the light source 14 are concentrated by the elliptical reflector 20 in a light spot at its second focus 16, in order to form a beam of substantially parallel rays at the exit from the lens 30. The two foci of the elliptical reflector define the optical axis AA of the headlight 10.

In a known manner, a screen 50 can be disposed on the path of the light rays, so as to eliminate, in the beam emerging from the lens 30, the light rays situated above a predetermined limit called the cutoff, and thus to form a so-called "dipped" beam, not dazzling the drivers of vehicles traveling in the opposite direction.

Figure 2:
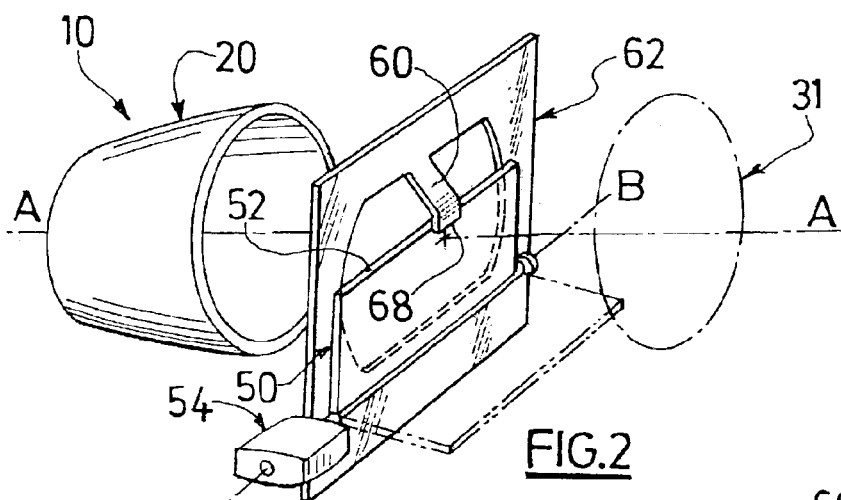
FIG. 2 depicts a view in schematic perspective of the headlight of FIG. 1.

The screen 50 is advantageously disposed in the focal plane 34 of the lens 30, so that its edge 52 delimits the shape of the cutoff of the light beam emerging from the lens 30. In a known fashion, the screen 50 can be mounted so as to be able to move between two positions, a position in which it eliminates from the final beam the rays situated above a predetermined cutoff, and a retracted position (shown in dotted lines in FIGS. 1 and 2) in which it allows all the light rays to pass in order thus to form a main beam. The screen can for example be mounted so as to pivot about an axis BB perpendicular to the optical axis AA and to be actuated by a motor 54.

Figure 3:
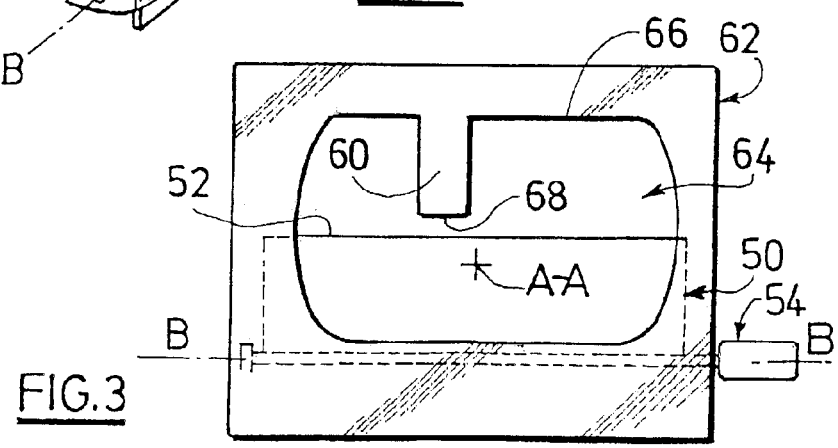
FIG. 3 depicts a front view of an obscuring element used in the headlight of FIG. 1.

In accordance with the present invention, provision is made for disposing an obscuring element 60 substantially perpendicular to the optical axis AA, at a distance from the object focal plane 34 of the convergent lens 30, and outside a vertical plane passing through the optical axis AA. In the embodiment in FIGS. 1 to 3, the obscuring element 60 is formed on an intermediate piece 62, for example disposed between the reflector 20 and the intermediate element 32.

The intermediate piece 62 can for example consist of a flat plate extending in the focal plane of the lens 30 and in which there is formed a central opening 64, the obscuring element 62 being formed on a tongue 62, for example rectangular in shape, extending from the internal edge 63 of the opening 64, so that the tongue 60 extends in the upper part of the headlight 10, that is to say on the other side of the screen 50 with respect to the optical axis AA. The tongue 62 is folded perpendicular to the plane of the intermediate piece 62 so that its bottom edge 68 is situated outside the focal plane of the lens 30. According to the part of the light beam which it is wished to modify, the obscuring element 60 can be given a predetermined shape and position with respect to the optical axis AA.

The advantage of disposing the obscuring element 60 outside the focal plane of the lens 30 lies in the fact that it forms in the final beam no dense, highly contrasted shadow, like the one which forms the cover 50 defining the cutoff of the dipped beam, for which it is sought precisely to obtain a clear limit between the illuminated zone and the dark zone. Being more or less greatly unfocused with respect to the lens 30, the obscuring element 60 merely has the effect of removing light rays from some areas of the final beam.

Figure 4:
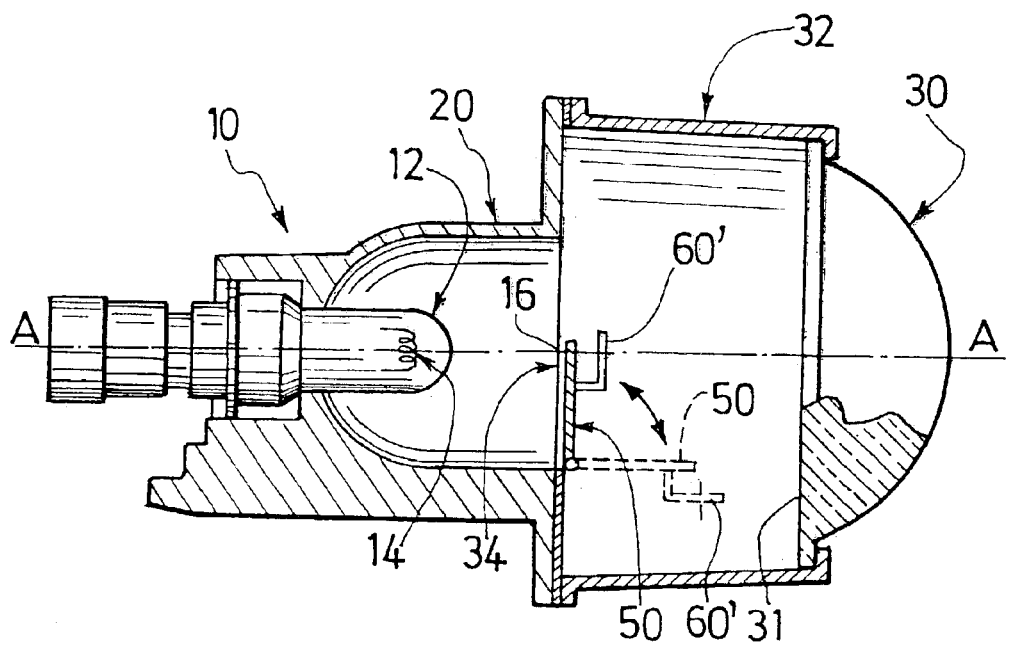
FIG. 4 depicts a schematic view in section of a headlight of the elliptical type according to a second embodiment of the present invention.
Figure 5:
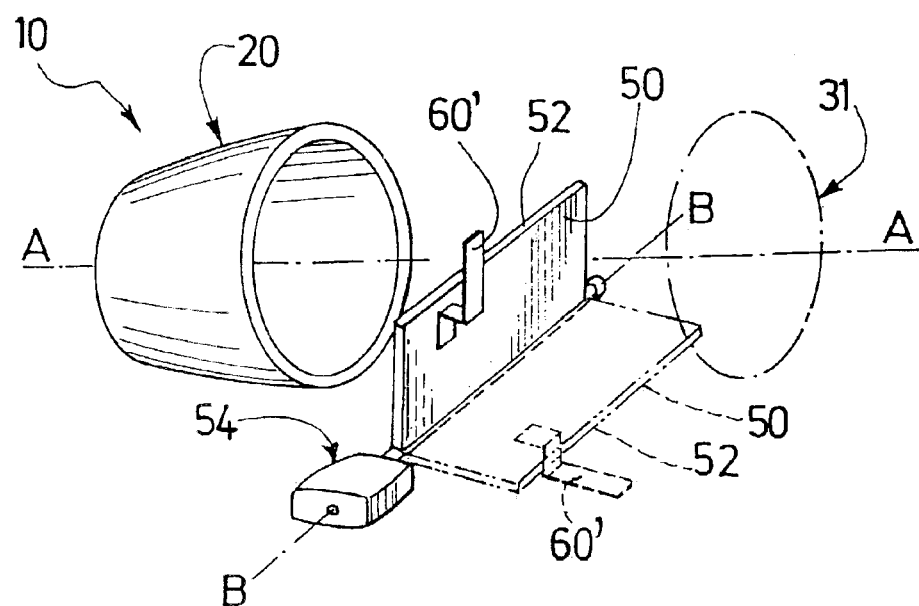
FIG. 5 depicts a view in perspective of the headlight of FIG. 4.

According to the embodiment in FIGS. 4 and 5, the obscuring element 60' is formed on the cutoff screen 50 itself, forming for example the end of a piece integral with the screen 50 extending outside the plane of the screen 50. As in the previous embodiment, it is disposed, when the screen 50 is in position to form a dipped beam, substantially perpendicular to the optical axis, at a distance from the object focal plane of the convergent lens 30, and outside a vertical plane passing through the optical axis AA. The closure elements 60' consist of a tongue, for example rectangular in shape, extending in the bottom part of the headlight 10, that is to say on the same side as the screen 50 with respect to the optical axis AA. Here also, according to the part of the light beam which it is wished to modify, the obscuring element 60' can be given a predetermined shape and position with respect to the optical axis AA when the screen 50 is in position to form a dipped beam.

For example, the elliptical headlights in which the screen forming the cutoff of the dipped beam can occupy two positions so as to form also a main beam can have very high levels of illumination close to this cutoff, thus making the dipped beam not in accordance with regulations. For example, the measuring points called 50LR or 25L1, situated just below the cutoff, in the left-hand part of the beam, may be too intense for a regulatory dipped beam. The obscuring element according to the present invention resolves this problem for a headlight selectively producing dipped and main beams.

It suffices to dispose an obscuring element 60' with predetermined shape and dimensions outside the focal plane of the lens 30 so that it takes off light rays only in certain areas of the final beam. The advantage of this embodiment lies in the fact that these light rays are taken off only from the dipped beam and not from the main beam, since the obscuring element 60' is integral with the movable screen 50.

Figure 6:
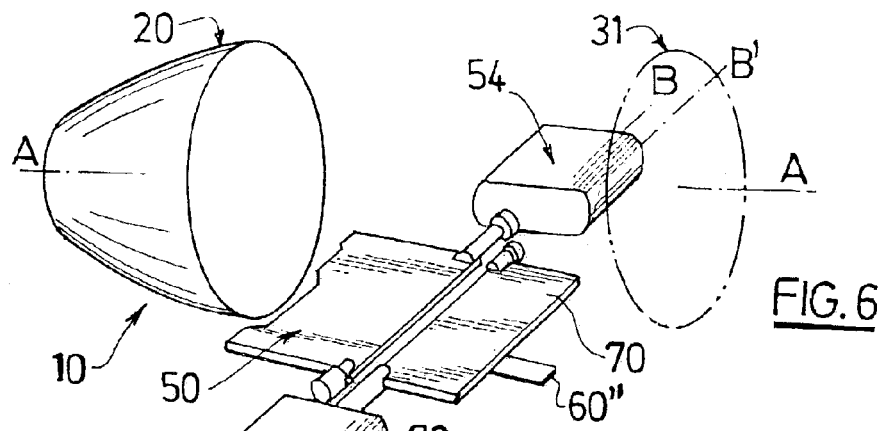
FIG. 6 depicts a schematic view in perspective of a headlight of the elliptical type according to a third embodiment of the present invention, for emitting a first beam.
Figure 7:
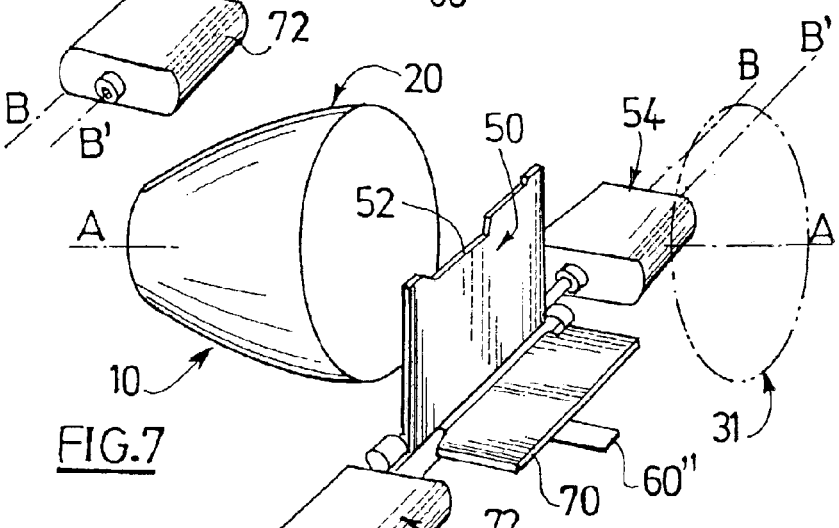
FIG. 7 depicts a view in perspective of the headlight of FIG. 6 for emitting a second beam.
Figure 8:
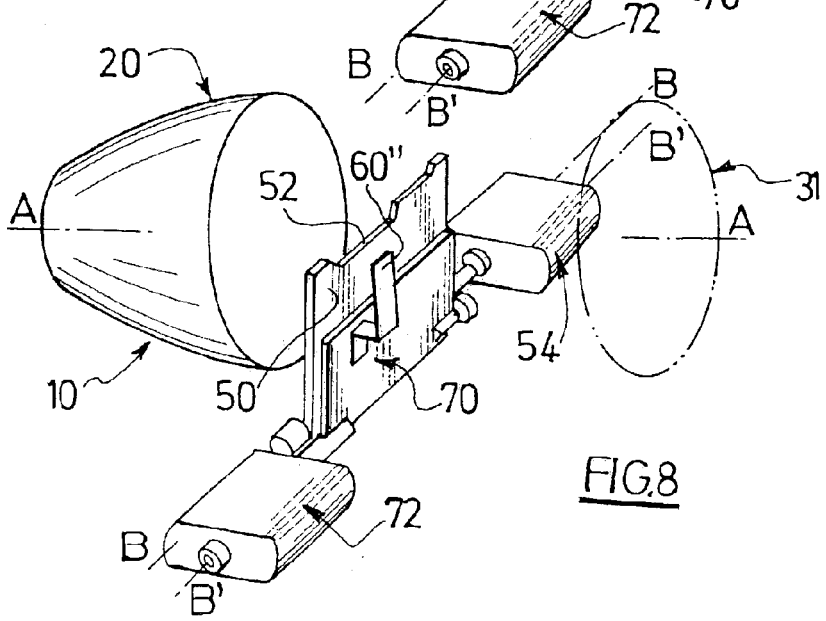
FIG. 8 depicts a perspective view of the headlight of FIG. 6 for emitting a third beam.

According to the embodiment in FIGS. 6 to 8, the obscuring element 60" is formed on a movable support 70, so as to be able to be interposed in the light beam according to the characteristics which it is wished to confer on this beam. In FIG. 8 a headlight can be seen in which the screen 50 and the obscuring element 60" are in the retracted position, so as not to intercept any of the light rays reflected by the reflector 20. The headlight 10 then emits for example a main beam. In FIG. 7, only the screen 50 is brought into the position in which its edge 52 is situated in the focal plane of the lens 30. The beam emitted by the headlight 10 is therefore a cutoff beam, for example a dipped beam.

In FIG. 8, the obscuring element 60" is also brought into a position in which it intercepts some of the light rays reflected by the reflector 10. The obscuring element 60" is for example formed on a part 70 able to move about an axis B'B', parallel to the rotation axis BB of the screen 50 and perpendicular to the optical axis AA, under the effect of a motor 72.

As in the previous embodiments, it is disposed, when it is in this position, substantially perpendicular to the optical axis AA, at a distance from the object focal plane of the convergent lens 30 and outside a vertical plane passing through the optical axis AA, as can be seen in FIG. 8. The obscuring element 60" consists here also of a tongue, for example rectangular in shape, extending in the bottom part of the headlight 10. Just as in the previous embodiments, according to the part of the light beam which it is wished to modify, the obscuring element 60" can be designed so that it has a predetermined shape and a predetermined position with respect to the optical axis AA.

For example, it may be wished, in rainy weather, to illuminate less intensely the side of the road on which the vehicles are traveling in the opposite direction, so that their drivers are less dazzled by the reflection of the light on the wet part of the roadway situated between two vehicles traveling in opposite directions. It then suffices to actuate the motor 72 so that it brings the obscuring element 60" into the position depicted in FIG. 8. The shape and position of the obscuring element 60" are such that it intercepts, in the light beam emitted by the headlight 10, the major part of the rays of the dipped beam situated in the left-hand part of the beam for example, for a direction of travel on the right.

There has therefore indeed been produced according to the present invention a lighting device for a motor vehicle, which produces a main beam and/or a dipped beam, having a photometry in accordance with the current regulations, and which has an obscuring element for modifying the photometry of the beam emitted by the lighting or signaling device at predetermined points on this light beam according to the areas of this beam in which it is desirable to reduce the light intensity emitted. Such a modification of the light beam is obtained using means which are particularly simple and therefore reliable and inexpensive.

Naturally the present invention is not limited to the embodiments which have been described, but a person skilled in the art will on the contrary be able to make many modifications to it coming within its scope. Thus for example the obscuring element can be disposed in front or behind the focal plane of the convergent lens.

What is claimed is:

1. Lighting device for an automobile, comprising:
    a light source situated at the first focus of a reflector of the elliptical type;
    a convergent lens being disposed in front of the light source so that the second focus of the elliptical reflector is contained in the object focal plane of the convergent lens, the first and second foci of the elliptical reflector defining an optical axis of the lighting device; and
    an obscuring element being disposed substantially perpendicular to the optical axis, and substantially situated outside a vertical plane extending along the optical axis, and at a distance from the object focal plane of the convergent lens.

2. A device as claimed in claim 1, wherein the obscuring element is disposed in the lighting device fixedly with respect to the light source.

3. A device as claimed in claim 2, wherein the obscuring element is formed on a piece integral with the reflector.

4. A device as claimed in claim 3, wherein the obscuring element comprises a screen intended to define a cutoff in a light beam emitted from the lens.

5. A device as claimed in claim 4, wherein the screen is able to move between two positions a first position in which the screen intercepts part of the light rays reflected by the reflector so that the beam emerging from the lens incorporates a cutoff, and a second position in which the screen lets pass all the light rays reflected by the reflector so that the beam emerging from the lens does not incorporate any cutoff.

6. A device as claimed in claim 1, wherein the obscuring element is formed on a screen delimiting a cutoff in the light beam emerging from the lens.

7. A device as claimed in claim 6, wherein the screen is able to move between two positions, a first position in which the screen intercepts part of the light rays reflected by the reflector so that the beam emerging from the lens incorporates a cutoff, and a second position in which the screen lets pass all the light rays reflected by the reflector so that the beam emerging from the lens does not incorporate any cutoff.

8. A device as claimed in claim 7, wherein the obscuring element forms the end of a piece integral with the screen.

9. A device as claimed in claim 1, wherein the obscuring element is formed on a movable support.

10. A device as claimed in claim 9, wherein the support is able to move in rotation about an axis perpendicular to the optical axis.

11. An automobile lighting device comprising:
    an elliptical reflector having a first focus and a second focus defining an optical axis of the lighting device;
    a light source disposed at the first focus of the reflector;
    a convergent lens disposed in front of the light source so that the second focus of the elliptical reflector is contained in an object focal plane of the convergent lens; and
    an obscuring element disposed substantially perpendicular to the optical axis and at a distance from the object focal plane of the convergent lens,
    wherein the obscuring element is substantially situated outside a vertical plane extending along the optical axis.

* * * * *